July 20, 1965   H. A. TOULMIN, JR   3,196,047
DIRECT CONVERSION OF ATOMIC ENERGY INTO ELECTRICITY
Filed May 13, 1959   2 Sheets-Sheet 1

INVENTOR
HARRY A. TOULMIN, JR.

BY *Toulmin & Toulmin*

ATTORNEYS

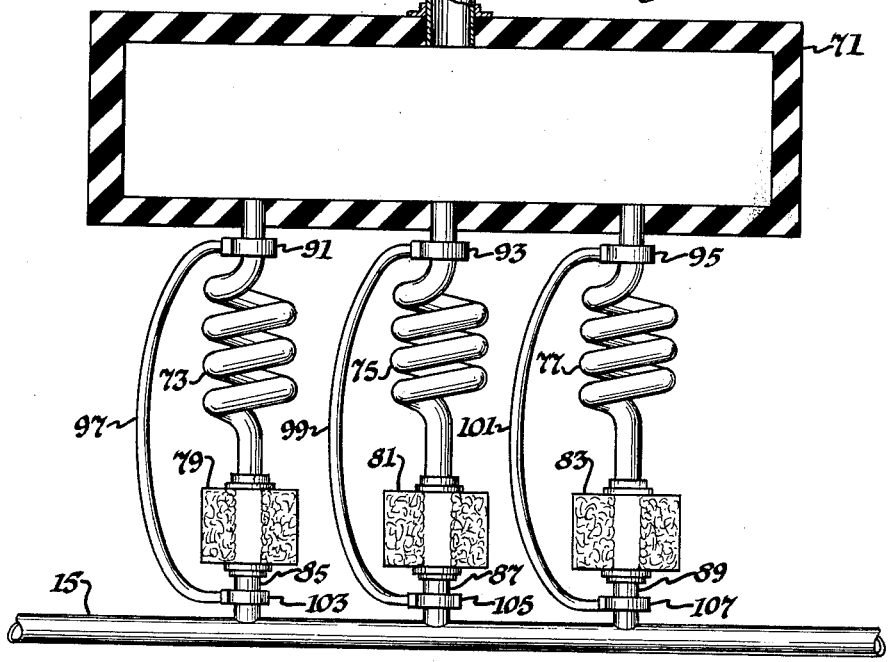
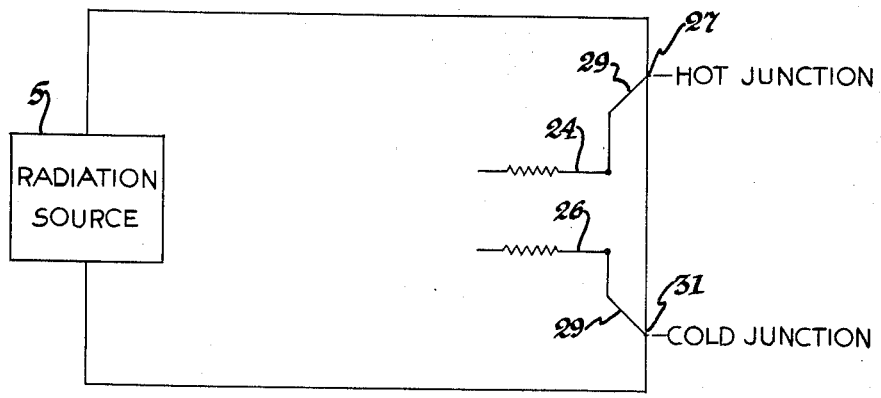

United States Patent Office 3,196,047
Patented July 20, 1965

3,196,047
DIRECT CONVERSION OF ATOMIC ENERGY
INTO ELECTRICITY
Harry A. Toulmin, Jr., Dayton, Ohio, assignor to The Commonwealth Engineering Company of Ohio, Dayton, Ohio
Filed May 13, 1959, Ser. No. 812,872
7 Claims. (Cl. 136—4)

This application is a continuation-in-part of the copending application Serial No. 339,095, filed February 26, 1959, now abandoned.

The present invention relates to the conversion of thermal energy into electrical energy, more particularly to directly converting thermal energy produced by a nuclear reactor into electrical energy.

A controlled nuclear reaction which releases heat relatively slowly over a long period of time is now an established reality. This invention particularly contemplates the provision of means of utilizing the heat so generated to attain electrical power suitable for the motivation of electrical apparatus.

It is further within the contemplation of this invention to provide a compact unit which may be economically produced for employment in power installations.

It is known that the electromotive force developed by a thermopile is proportional to the number of thermocouples in the assembly and the temperature gradient between the hot and cold junctures of the thermocouples. It is within the contemplation of this invention to provide a multi-thermocouple unit in which the temperature gradient and accordingly the current output may be very high.

These objectives are attained, generally speaking, in the practice of the invention by utilizing the heat from a radiant source to maintain a molten metal at a high temperature, which molten metal is itself subjected to a heat extraction process by preferably a liquid metal. The heat extraction process for the molten metal results in a temperature differential across the conduit carrying the metal which temperature differential may be transformed into an electrical differential as hereinafter described in connection with the following detailed description and accompanying drawings wherein:

FIGURE 2 is a schematic view, partially in section, of a portion of the nuclear power plant illustrating a modification of the present invention; and FIGURE 3 is a diagrammatic view showing the electrical connections with respect to the primary coolant line.

Figure 1:
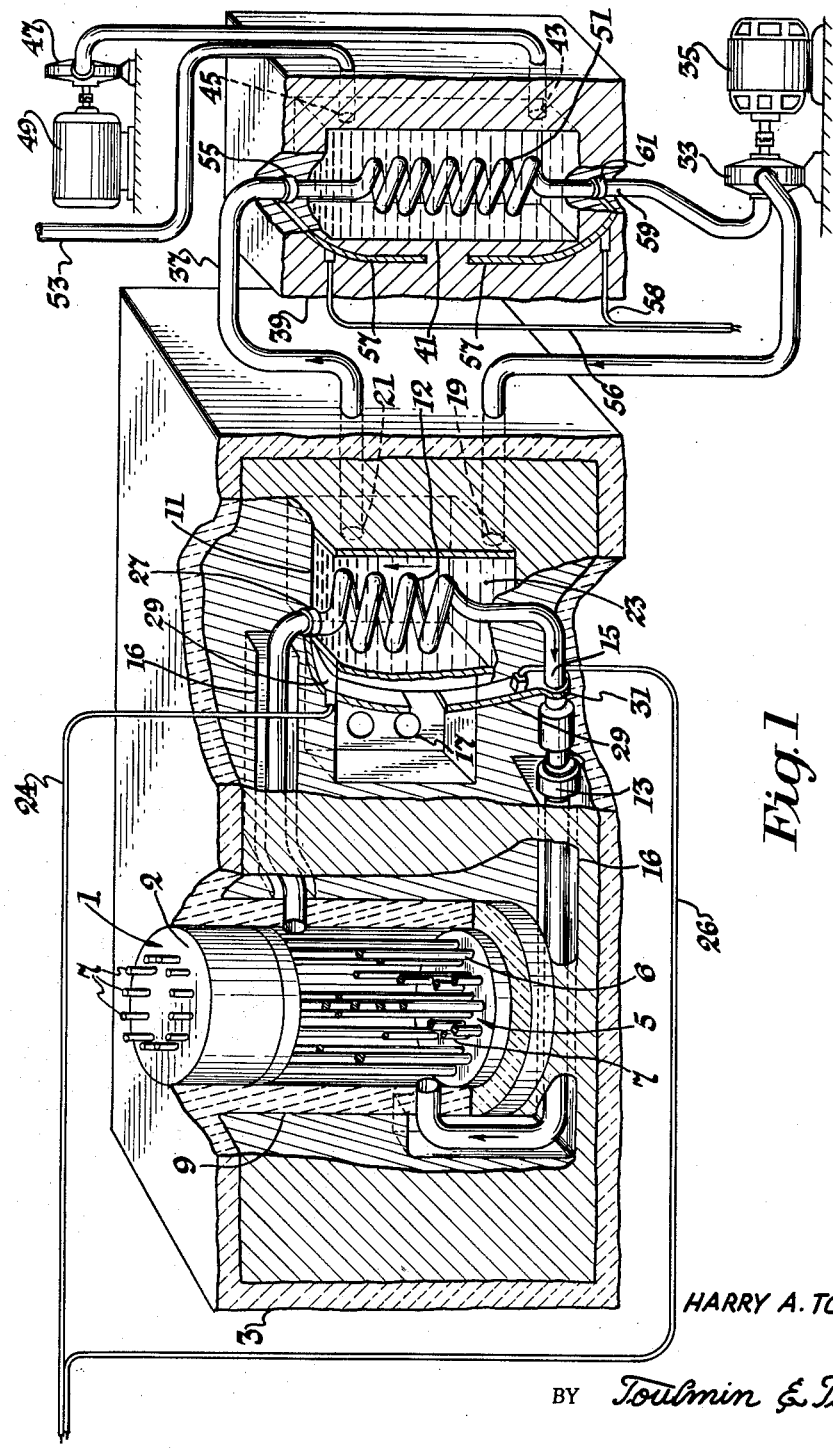
FIGURE 1 is a schematic view, partially in section, illustrating the structure of this invention as it is incorporated into a conventional nuclear power plant.

Proceeding now to the drawings, wherein like reference symbols indicate the same parts throughout the various views, there is illustrated in FIGURE 1 a reactor 1 which has a top shield 2 having a thickness of several feet of concrete. The reactor is of the sodium loop type and is referred to as a sodium graphite reactor (SGR). The reactor has the conventional shielding structure, which essentially comprises a thermal barrier and a radiation shield of concrete 9. The reactor and the components of the nuclear power plant, as will be further described, are encased in a concrete housing 3 which in a stationary power plant is mounted underground. Additional radiation shielding, such as lead, may be provided within the housing 3 surrounding the units therein. Where the power plant is mounted in a boat or a moving vehicle, adequate shielding is provided.

The reactor 1 comprises a core 5 which has fuel elements 6 and moderator elements 7 therein. The fuel elements comprise uranium enriched in U-235 to 2-3%, and each element is sealed in a stainless steel jacket. Each moderator element comprises graphite blocks in sealed zirconium cans.

A control mechanism, which is of a known type and is not shown, is connected to the ends of the moderator elements extending through the top shield and is operable to position the moderator elements in the reactor core so as to control the absorption of neutrons in order to regulate the nuclear reaction.

Also positioned in the housing 3 is a stainless steel intermediate heat exchanger 11. A stainless steel conduit or line 15 forms a closed path through the reactor and the intermediate heat exchanger. The line 15 represents one stage of the coolant system. In sodium loop reactors, two stages of the cooling system are required, since there is danger of leakage (and subsequently major damage) if the highly radioactive and strongly alkaline sodium comes in close contact to the steam system.

The conduit 15, as it passes through the heat exchanger 11, comprises a series of coils 12. A pump 13 is provided to maintain the flow of sodium through the primary cooling stage.

Sodium is used as the heat transfer fluid because it has extremely high thermal conductivity. Sodium melts at 208° F. and boils at 1620° F., which properties enable sodium to perform as a satisfactory heat transfer fluid.

There are tunnels 16 interconnecting the intermediate heat exchanger and the reactor for housing the line 15. The sodium enters the reactor at substantially the bottom thereof so as to flow up through the core around the fuel elements.

While the intermediate heat exchanger 11 has been described as having a coil therein, this heat exchanger may also be of the boiler tube type.

The second stage of the cooling system comprises a stainless steel conduit or line 37 which connects the lower and upper portions of the intermediate heat exchanger 11 through an entrance port 19 and a discharge port 21, respectively. Liquid sodium also flows through this line, but since this sodium is isolated from the primary sodium, it is non-radioactive.

A steam generator 39 having a boiler portion 41 is also interconnected to the coolant system 37, and the system 37 has a plurality of coils 51 therein as it passes through the steam generator. A pump 33 powered by a motor 35 is provided in the line 37 to circulate the secondary sodium therethrough. The sodium is flowed through the secondary system 37 contra to the flow of the sodium in the primary system within the intermediate heat exchanger 11.

A steam line 53 is connected to the steam generator 39 at a discharge port 45 and is connected to a turbine and a condenser which are not shown. There is also a pump 47, driven by a motor 49, in the steam line 53 to circulate the feed water which emerges from the condenser through the steam generator. The feed water enters the steam generator through the entrance port 43 at a temperature of about 300° F. and is boiled within the steam generator to form steam at about 800° F. and about 850 pounds per square inch pressure.

The above description is of a conventional and known nuclear power plant. In order to convert the thermal energy produced in the reactor directly into electricity, the following structure is incorporated into the power plant.

Cobalt alloy members 29 are secured to cobalt alloy collars 27 and 31 which are positioned on the conduit 15 before and after the conduit passes through the intermediate heat exchanger. The temperature of the sodium as it enters the intermediate heat exchanger is about 925° F., and the temperature of the sodium leaving the heat exchanger is about 500° F. The connections of the collars at these two points form hot and cold junctions of a thermocouple.

The metallic members 29 are plate-like in shape and are connected to an electrical circuit comprising electrical leads 24 and 26. Thus, the electrical current generated as a result of the dissimilar metals maintained at different temperatures is utilized through the leads 24 and 26.

Passages 17 are provided in the shielding of the nuclear power plant for the flow of air to cool the metallic members 29.

A second electrical circuit is formed with respect to the secondary coolant system. This electrical circuit similarly comprises collars 55 and 61 of a cobalt alloy, which are mounted on the conduit 37 at the entrance and exit of this line with respect to the steam generator. Metallic members 57, also of a cobalt alloy, are then connected to the collars 55 and 61. Electrical leads 56 and 58 are connected to each of the members 57 to form an electrical circuit for utilizing the electrical current generated at the collars 55 and 61.

The temperature of the sodium as it enters the steam generator is about 900° F., and the temperature of the sodium as it leaves the steam generator is about 475° F. This difference in temperature between the collars 55 and 61 provides a temperature gradient between the junctions of dissimilar metals formed by the mounting of the cobalt alloy collars upon the stainless steel conduit.

If desired, a nickel-chromium alloy section may be inserted in either of the primary or secondary cooling lines 15 and 37 at the hot and cold points thereof. A collar of a cobalt alloy is then positioned upon the sections so as to form junctions of dissimilar metals.

The sodium flowing through the coil 51 passes downwardly through the steam generator as seen in FIGURE 1, and then is pumped by the pump 33 through the intermediate heat exchanger 11. The water in the steam line 53 is circulated through the steam generator contra to the flow of sodium in the coils 51.

The power which is derived from the apparatus as described above and illustrated in FIGURE 1 is limited, even if the electrical energy obtained from the two electrical circuits is combined. Thus, it may be desirable that equipment be provided to connect the thermal points at the hot and cold junctions in series. Such a structure is illustrated in FIGURE 2. This structure can be substituted within the intermediate heat exchanger 11 for coil 12 shown in the embodiment of FIGURE 1. Such structure would include the coils 73, 75 and 77 and connecting pipes between the primary coolant line 15 and manifold 71. In the modification of FIGURE 2, the primary coolant line 15 terminates in a manifold 71 of an electrically insulating material such as a ceramic, hard rubber, or ebonite. The manifold 71 may be outside of the vessel 11. Extending from the manifold 71 into the vessel 11 are stainless steel coils 73, 75 and 77, each of which has a ceramic insulating section as illustrated at 79, 81 and 83 and shown in section. The coils 73, 75 and 77 are connected commonly through the manifold 71 to the coolant line 15 and which coils are substituted in place of coil 12, as illustrated in FIGURE 1. In the structure shown, the coils 73, 75 and 77 are enclosed in a heat exchanger similarly as illustrated at 11 in FIGURE 1. Fluid lines 85, 87 and 89 are respectively connected to said insulating portions. The lines 85, 87 and 89 may empty into a manifold, which is not shown, for return of the liquid sodium through the remainder of the system through the line 15 or directly into line 15 as shown in FIGURE 2. Cobalt alloy collars 91, 93 and 95 are provided above each of the coils and function both as a terminal means and as supports for the cobalt alloy plate members 97, 99 and 101, respectively. These plate members are themselves respectively connected by suitable collars of a cobalt alloy 103, 105 and 107 to the fluid lines 85, 87 and 89, respectively, and also function as terminal points and cold junctions similarly as at the thermocouple junction 31. When liquid sodium is flowed through the coils 73, 75 and 77, the interior of these coils is lined with an electrically insulating material such as a ceramic, which may be a cemented carbide. This will prevent the existence of a short circuit across the terminals of the metal plates in each of the coils.

The thermocouple junctions formed may then be connected in series so as to add the currents generated in the coils as a result of the flow of the liquid sodium through the inlet port to the outlet ports 85, 87 and 89. In this latter structure each of the coils is separately provided with means for the counterflow of sodium as set forth in FIGURE 1, the structure having been excluded from FIGURE 2 for purposes of clarity.

In FIGURE 3 there is shown a diagrammatic view of the manner in which the electrical circuit is connected across the hot and cold junctions formed in the primary cooling system.

The theory of operation of the structure of invention is depicted in FIGURE 3; the radiation source to the left in the figure produces the controlled high temperature; the flow of hot molten metal results in the necessary hot junction, and the effective cooling attained by the coolant achieves the required cold junction. Since the electrically connected hot and cold junctions result in a potential difference therebetween, a current may be readily derived therefrom.

It will be appreciated from the foregoing that relatively high temperatures may be developed in the flowing sodium and that such may be readily cooled by counter-current flow of mercury and a high temperature gradient may be attained across the secured ends of the stainless steel pipe and the metal. It is to be understood, however, that other metals than those specifically set forth are suitable either for the piping or to replace the electrically conductive plate. Thus, the materials which have the following melting points may be effectively employed, it being understood that it is only necessary that two metals be provided in each unit, one for the piping and a dissimilar metal for the plate; the melting point of these materials are listed below:

| | ° C. |
|---|---|
| Platinum | 1773 |
| Titanium | 1800 |
| Rhodium | 1966 |
| Indium | 2454 |
| Molybdenum | 2620 |
| Osmium | 2700 |
| Cadmium | 2850 |

It will also be appreciated that alloys of these materials, such as the platinum and indium alloys, may be substituted.

Since only one complete path for circulating circuits is required the flow line itself may, if desired, incorporate electrically insulating material, as the hard rubber of FIGURE 2.

It will be understood that this invention is susceptible to modification in order to adopt it to different usages and conditions and accordingly, it is desired to comprehend such modifications within this invention as may fall within the scope of the appended claims.

What I claim is:

1. In an apparatus for the direct conversion of nuclear thermal energy into electrical energy, a nuclear thermal energy source of controlled thermal radiation, a chamber having a coolant fluid flowing therethrough, a fluid line passing through said source of thermal radiation and then through said chamber to form a closed path with said heated fluid flowing contra to the flow of said coolant, the portion of said line passing through said chamber being metallic so that hot and cold points are formed thereon by heat exchange between said heated fluid and said coolant, metallic members of a metal dissimilar to the metal of said line connected to said hot and cold points to form hot and cold thermocouple junctions and an electrical resistance circuit connected between said metallic members to utilize the electrical current generated by the temperature gradient between said hot and cold thermocouple junctions.

2. In an apparatus for the direct conversion of nuclear thermal energy into electrical energy, a nuclear thermal energy source of controlled thermal radiation, a chamber having a coolant fluid flowing therethrough, a closed fluid line passing through said source of thermal radiation to heat the fluid and then through said chamber with said heated fluid flowing contra to the flow of said coolant, the portion of said line passing through said chamber being metallic so that hot and cold points are formed thereon by heat exchange between said heated fluid and said coolant, a first metallic member connected to the metallic portion of said line where the line emerges from said source of radiation to form a hot thermocouple junction, a second metallic member connected to the metallic portion of said line just before the line enters the source of radiation to form a cold thermocouple junction, said metallic members being composed of two dissimilar metals to provide said hot and cold junctions, and an electrical resistance circuit connected to each of said metallic members to utilize the electrical current generated by the temperature gradient between said hot and cold junctions.

3. In an apparatus for the direct conversion of nuclear thermal energy into electrical energy, a reactor for sustaining a nuclear reaction therein, a metallic conduit forming a closed path through said reactor, a heat-conductive liquid flowing through said closed path of the conduit to convey the heat of the nuclear reaction from said reactor, metallic members of a metal dissimilar from said conduit line and connected to said conduit at points having a temperature gradient therebetween to form hot and cold thermocouple junctions, and an electrical resistance circuit connected to each of said metallic members to utilize the electrical current generated by the temperature gradient between said hot and cold thermocouple junctions.

4. In an apparatus for the direct conversion of nuclear thermal energy into electrical energy, a reactor for sustaining a nuclear reaction therein, a metallic conduit flowing a closed path through said reactor, a heat-conductive liquid flowing through said closed path conduit to convey the heat of the nuclear reaction from said reactor, means to cool a portion of said closed conduit, metallic members of a metal dissimilar from said conduit line and connected to said conduit at points having a temperature gradient therebetween to form hot and cold thermocouple junctions, and an electrical resistance circuit connected to each of said metallic members to utilize the electrical current generated by the temperature gradient between said hot and cold thermocouple junctions.

5. In an apparatus for the direct conversion of nuclear thermal energy into electrical energy, a reactor for sustaining a nuclear reaction therein, a metallic conduit forming a closed path through said reactor, a heat-conductive liquid flowing through said closed path of the conduit to convey the heat of the nuclear reaction from said reactor, an intermediate heat exchanger in said closed path of the metallic conduit, a second metallic conduit forming a second closed path flowing through said heat exchanger and conveying a liquid therethrough contra to the flow of the liquid passing through said first conduit, means to cool a portion of said second metallic conduit, metallic members of a metal dissimilar from the metal of said conduits and connected to said conduits at points having a temperature gradient therebetween so as to form two pairs of hot and cold thermocouple junctions, and an electrical resistance circuit connected across each pair of metallic members to utilize the electrical current generated by the temperature gradient between said hot and cold thermocouple junctions.

6. In an apparatus for the direct conversion of nuclear thermal energy into electrical energy, a reactor for sustaining a nuclear reaction therein, a stainless steel conduit interconnecting opposed sides of said reactor and forming a closed path, liquid sodium flowing through said stainless steel conduit to convey the heat of the reaction from said reactor, a thermocouple comprising metallic members formed from a cobalt alloy connected to said stainless steel conduit at points having a temperature gradient therebetween, and an electrical resistance circuit interconnecting said metallic members to utilize the electical current generated by the temperature gradient between said hot and cold junctions.

7. In a method of directly converting thermal energy produced by a nuclear reactor into electrical energy, comprising flowing a heat conductive fluid through said nuclear reactor and establishing hot and cold thermocouple junctions at different stations along the path of said fluid with dissimilar metals, said dissimilar metals comprising cobalt alloy metal collars and which are connected directly with a stainless steel conduit, and whereby at said stations there is generated an electric current therebetween, and drawing off the electrical energy from said stations.

References Cited by the Examiner

UNITED STATES PATENTS

| 546,417   | 9/95  | Cox         | 136—4.12  |
| 724,572   | 4/03  | Hall        | 136—4     |
| 2,671,817 | 3/54  | Groddeck    | 204—193.2 |
| 2,811,568 | 10/57 | Lloyd       | 136—4     |
| 2,902,423 | 9/59  | Luebke et al. | 204—193.2 |

FOREIGN PATENTS 618,508   2/49   Great Britain.

OTHER REFERENCES

Primary Batteries by W. R. Cooper, published by the Electrician Printing and Publishing Co., London 1902, pages 123–130.

College Physics, by A. L. Foley, revised by J. L. Glathart, 4th edition, The Blakiston Co., Philadelphia 1947, pages 374, 384–388.

REUBEN EPSTEIN, *Acting Primary Examiner.*

CARL D. QUARFORTH, LEON D. ROSDOL, ROGER L. CAMPBELL, WILLIAM G. WILES, *Examiners.*